United States Patent
Murakami et al.

(10) Patent No.: US 7,026,792 B2
(45) Date of Patent: Apr. 11, 2006

(54) APPARATUS AND METHOD FOR CONTROLLING OUTPUT OF SECONDARY BATTERY, BATTERY PACK SYSTEM, AND ELECTRIC VEHICLE

(75) Inventors: Yusai Murakami, Hamamatsu (JP); Teruyoshi Egoshi, Toyohashi (JP); Norito Yamabe, Toyohashi (JP)

(73) Assignee: Panasonic Ev Energy Co., Ltd., Shizuoka (JP)

( * ) Notice: Subject to any disclaimer, the term of this patent is extended or adjusted under 35 U.S.C. 154(b) by 12 days.

(21) Appl. No.: 10/498,391

(22) PCT Filed: Dec. 2, 2002

(86) PCT No.: PCT/JP02/12616

§ 371 (c)(1),
(2), (4) Date: Jun. 10, 2004

(87) PCT Pub. No.: WO03/061093

PCT Pub. Date: Jul. 24, 2003

(65) Prior Publication Data

US 2005/0104558 A1    May 19, 2005

(30) Foreign Application Priority Data

Dec. 27, 2001    (JP) ............... 2001-398112

(51) Int. Cl.
*H02J 7/00* (2006.01)
(52) U.S. Cl. ...................................... 320/135
(58) Field of Classification Search ........ 320/135, 320/104; 324/433; 361/90–92; 702/63–64; 322/99; 180/65.2
See application file for complete search history.

(56) References Cited

U.S. PATENT DOCUMENTS

| | | | |
|---|---|---|---|
| 5,600,215 A | 2/1997 | Yamada et al. | 318/139 |
| 5,808,428 A | 9/1998 | Ito et al. | 318/139 |
| 6,111,731 A | 8/2000 | Cepynsky et al. | 361/23 |

FOREIGN PATENT DOCUMENTS

| | | | |
|---|---|---|---|
| JP | 9-215111 | | 8/1997 |
| JP | 10-191502 | | 7/1998 |
| JP | 10257605 | * | 9/1998 |
| JP | 10-304503 | | 11/1998 |
| JP | 2002-281677 | | 9/2002 |

* cited by examiner

*Primary Examiner*—Pia Tibbits
(74) *Attorney, Agent, or Firm*—Hamre, Schumann, Mueller & Larson, P.C.

(57) ABSTRACT

There is provided a battery pack system that allows an output limit during short-time discharging and long-time discharging of a secondary battery, and limits the output appropriately upon request of a vehicle. An output limiting section 104 is provided for changing a limit value of output electric power from the secondary battery when voltage data V (n) from a voltage measuring section 102 reaches a predetermined discharging termination voltage. The output limiting section 104 has short-time output information (Pp) for allowing short-time discharging of the secondary battery and normal output information (Pn) for allowing long-time discharging of the secondary battery, and sets a first discharging termination voltage (V1) during short-time discharging to be lower than a second discharging termination voltage (V2) during long-time discharging.

10 Claims, 4 Drawing Sheets

APPARATUS AND METHOD FOR CONTROLLING OUTPUT OF SECONDARY BATTERY, BATTERY PACK SYSTEM, AND ELECTRIC VEHICLE

TECHNICAL FIELD

The present invention relates to a technique for controlling the maximum output of a secondary battery such as a nickel-metal hydride (Ni-MH) battery to be mounted as a power source for a motor and a driving source for various loads, in motor-driven vehicles such as a pure electric vehicle (PEV), a hybrid electric vehicle (HEV), a hybrid vehicle with a fuel cell and a battery, and the like.

BACKGROUND ART

Conventionally, in an HEV, when an output from an engine is large with respect to the motive power required for driving, an electric generator is driven with surplus motive power to charge a secondary battery. On the other hand, when an output from an engine is small, a motor is driven with the electric power from a secondary battery to output supplementary motive power. In this case, a secondary battery is discharged. When a secondary battery is mounted on an HEV or the like, it is necessary to maintain an appropriate operation state by controlling such charging/discharging, etc.

In this case, it is important in battery control to perform output control for limiting the electric power supplied from a secondary battery. The output control aims at preventing damage and deterioration of the battery and increasing its life by transmitting information about the maximum output that can be discharged from the secondary battery, from an electronic control unit for a battery (hereinafter, abbreviated as a "battery ECU") to an electronic control unit for a vehicle (hereinafter, abbreviated as a "vehicle ECU").

The maximum output is determined in view of the balance between the electric power required by the vehicle for the battery and the holding time with the electric power. Both factors are important since they have an effect on drivability during driving.

Generally, the minimum voltage (discharging termination voltage) of the battery is set, and an output is limited when the minimum voltage is reached due to discharging. FIG. 4 shows an example of a change with the passage of time in a battery voltage Vb (voltage per block) and an output limit value Pout in a conventional output control method. In FIG. 4, the discharging termination voltage is set to 12.0 V, and the maximum output is limited to 20 kW. When the battery voltage Vb is decreased by discharging to reach 13.0 V as an output limit preparatory voltage in a normal output mode (time interval T1), a preparatory stage (time interval T2: about 10 seconds, for example) for an output limit is started. When the battery voltage Vb further is decreased to reach 12.0 V as the discharging termination voltage, an output limit mode (time interval T3) is started, where the output power Pout gradually is decreased (e.g., maximum decrease of 2 kW/second in rated output in FIG. 4) every time the battery voltage Vb reaches the discharging termination voltage (12.0 V).

However, when the holding time with the maximum output is made longer, the maximum output value becomes lower. Consequently, the burden on the engine of a vehicle side is increased in the case of an HEV or the like. On the other hand, when the holding time is made shorter, a high output can be realized in a moment. However, the battery voltage is decreased and an output is limited immediately, resulting in a drastic decline in drivability.

Steady driving is given top priority in vehicle control. Thus, the battery ECU has to transmit normal output information for longer holding time to the vehicle ECU rather than short-time output information for a high output only for a short time (e.g., several seconds or less).

DISCLOSURE OF INVENTION

The present invention has been achieved in view of the above problems, and its object is to provide an apparatus and a method for controlling an output of a secondary battery that allows an appropriate battery output upon request of a vehicle by using two pieces of information, i.e., short-time output information and normal output information; a battery pack system using the apparatus and the method; and a motor-driven vehicle with the battery pack system mounted thereon.

In order to achieve the above-mentioned object, a first apparatus for controlling an output of a secondary battery according to the present invention includes: a voltage measuring section for measuring a terminal voltage of a secondary battery as voltage data (V (n)); and an output limiting section for changing a limit value of output electric power from the secondary battery when the voltage data from the voltage measuring section reaches a predetermined discharging termination voltage. The output limiting section has short-time output information for allowing short-time discharging of the secondary battery and normal output information for allowing long-time discharging of the secondary battery, and sets a first discharging termination voltage (V1=9.6 V as a block voltage, for example) during short-time discharging to be lower than a second discharging termination voltage (V2=12.0 V as a block voltage, for example) during long-time discharging.

In order to achieve the above-mentioned object, a second apparatus for controlling an output of a secondary battery according to the present invention includes: a voltage measuring section for measuring as voltage data (V (n)), a terminal voltage of a battery pack that includes a combination of a plurality of cells as secondary batteries and is used in an intermediate state of charging; and an output limiting section for changing a limit value of output electric power from the secondary battery when the voltage data from the voltage measuring section reaches a predetermined discharging termination voltage. The output limiting section has short-time output information for allowing short-time discharging of the secondary battery and normal output information for allowing long-time discharging of the secondary battery, and sets a first discharging termination voltage (V1=9.6 V as a block voltage, for example) during short-time discharging to be lower than a second discharging termination voltage (V2=12.0 V as a block voltage, for example) during long-time discharging.

In each of the first and second apparatuses for controlling an output of a secondary battery, it is preferable that when the voltage data from the voltage measuring section reaches the first discharging termination voltage, the output limiting section changes the limit value of output electric power from a secondary battery so that the voltage of the secondary battery returns to the second discharging termination voltage within seconds.

In each of the first and second apparatuses for controlling an output of a secondary battery, it is preferable that the output limiting section sets the limit values of output electric power during short-time discharging and long-time discharging to the same value, and changes the limit value of output electric power from a secondary battery based on the second discharging termination voltage until the voltage data from the voltage measuring section reaches an output limit canceling voltage (V3=15.5 V, for example).

In each of the first and second apparatuses for controlling an output of a secondary battery, it is preferable that the output limiting section lowers the limit value of output electric power from a secondary battery every time the voltage data from the voltage measuring section reaches the second discharging termination voltage.

In each of the first and second apparatuses for controlling an output of a secondary battery, it is preferable that short-time discharging lasts for seconds and long-time discharging lasts for minutes.

It is preferable that each of the first and second apparatuses for controlling an output of a secondary battery further includes a temperature measuring section for measuring the temperature of a secondary battery as temperature data, and the output limiting section changes the limit value of output electric power from the secondary battery according to the temperature data from the temperature measuring section.

In this case, it is preferable that the output limiting section includes a look-up table that previously stores the limit value of output electric power from a secondary battery with a temperature being a parameter, and changes the limit value of output electric power from the secondary battery based on the look-up table.

In each of the first and second apparatuses for controlling an output of a secondary battery, the secondary battery is a nickel-metal hydride secondary battery.

In order to achieve the above-mentioned object, a first battery pack system according to the present invention includes: the second apparatus for controlling an output of a secondary battery; and a battery pack. In this case, it is preferable that the second apparatus for controlling an output of a secondary battery is configured as a computer system.

In order to achieve the above-mentioned object, a first motor-driven vehicle according to the present invention has the first battery pack system mounted thereon. In this case, it is preferable that the second apparatus for controlling an output of a secondary battery is configured as a computer system.

In order to achieve the above-mentioned object, a first method for controlling an output of a secondary battery according to the present invention includes: measuring a terminal voltage of a secondary battery as voltage data; and changing a limit value of output electric power from the secondary battery when the voltage data reaches a predetermined discharging termination voltage. Short-time output information for allowing short-time discharging of the secondary battery and normal output information for allowing long-time discharging of the secondary battery are provided, and a first discharging termination voltage during short-time discharging is set to be lower than a second discharging termination voltage during long-time discharging.

In order to achieve the above-mentioned object, a second method for controlling an output of a secondary battery according to the present invention includes: measuring as voltage data, a terminal voltage of a battery pack that includes a combination of a plurality of cells as secondary batteries and is used in an intermediate state of charging; and changing a limit value of output electric power from the secondary battery when the voltage data reaches a predetermined discharging termination voltage. Short-time output information for allowing short-time discharging of the secondary battery and normal output information for allowing long-time discharging of the secondary battery are provided, and a first discharging termination voltage during short-time discharging is set to be lower than a second discharging termination voltage during long-time discharging.

In each of the first and second methods for controlling an output of a secondary battery, it is preferable that when measured voltage data reaches the first discharging termination voltage, the limit value of output electric power from a secondary battery is changed so that the voltage of the secondary battery returns to the second discharging termination voltage within seconds.

In each of the first and second methods for controlling an output of a secondary battery, it is preferable that the limit values of output electric power during short-time discharging and long-time discharging are set to the same value, and the limit value of output electric power from a secondary battery is changed based on the second discharging termination voltage until measured voltage data reaches an output limit canceling voltage.

In each of the first and second methods for controlling an output of a secondary battery, it is preferable that the limit value of output electric power from a secondary battery is lowered every time measured voltage data reaches the second discharging termination voltage.

In each of the first and second methods for controlling an output of a secondary battery, it is preferable that short-time discharging lasts for seconds and long-time discharging lasts for minutes.

In each of the first and second methods for controlling an output of a secondary battery, it is preferable that the temperature of a secondary battery is measured as temperature data, and the limit value of output electric power from the secondary battery is changed according to the measured temperature data.

In this case, it is preferable that the limit value of output electric power is changed based on a look-up table that previously stores the limit value of output electric power from a secondary battery with a temperature being a parameter.

In each of the first and second methods for controlling an output of a secondary battery, the secondary battery is a nickel-metal hydride secondary battery.

In order to achieve the above-mentioned object, a second battery pack system according to the present invention includes: the computer system for performing the second method for controlling an output of a secondary battery; and a battery pack.

In order to achieve the above-mentioned object, a second motor-driven vehicle according to the present invention has the second battery pack system mounted thereon.

According to the configuration and the method as described above, the output value of a secondary battery can be set appropriately upon request of a vehicle such as an HEV by using two pieces of information, i.e., the short-time output information and the normal output information. For example, by allowing the vehicle to have a high output for a short time, the secondary battery also can be used to start the engine, change the gear, and the like.

BEST MODE FOR CARRYING OUT THE INVENTION

Hereinafter, a preferred embodiment of the present invention will be described with reference to the drawings.

Figure 1:
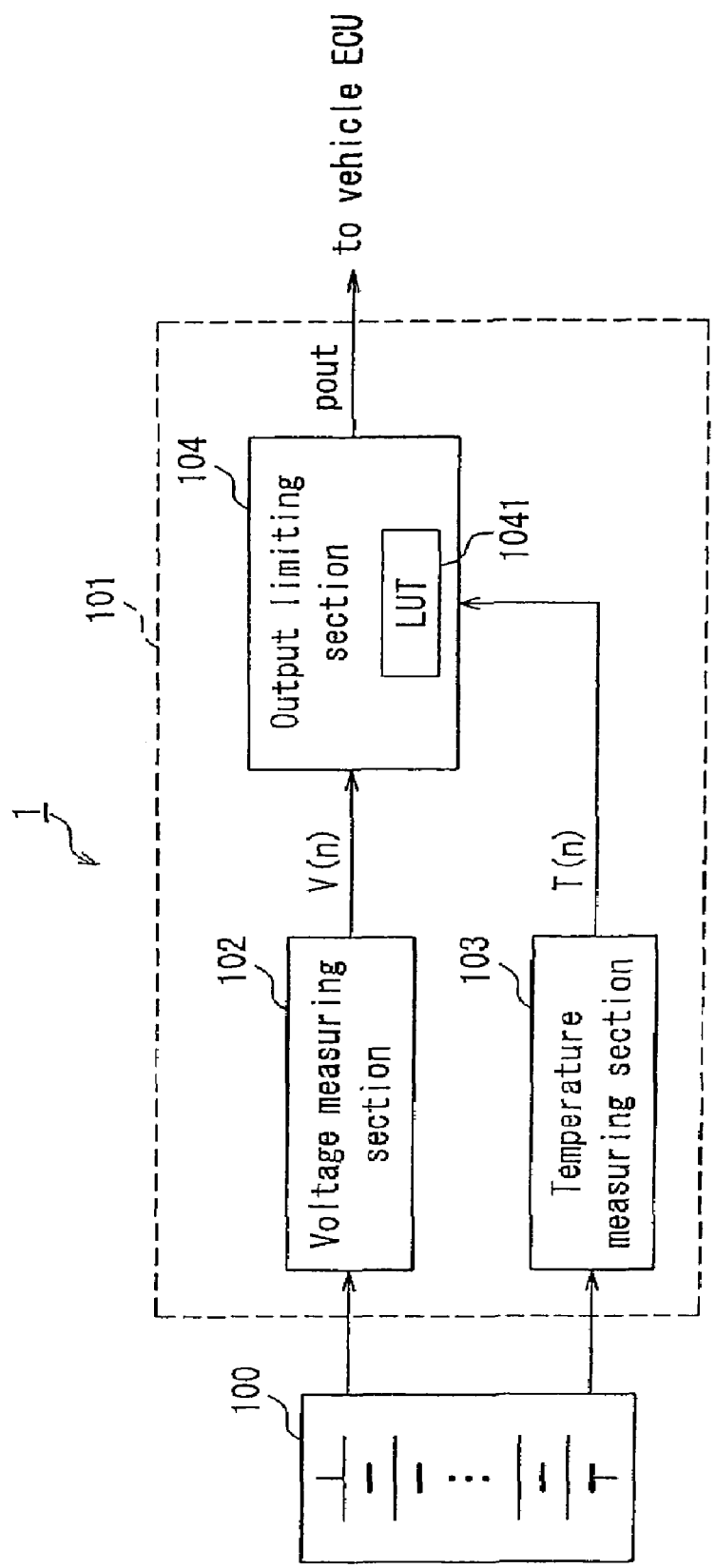
FIG. 1 is a block diagram showing an exemplary configuration of a battery pack system according to one embodiment of the present invention.

FIG. 1 is a block diagram showing an exemplary configuration of a battery pack system 1 according to one embodiment of the present invention. In FIG. 1, the battery pack system 1 includes a battery pack 100 and a battery ECU 101 including an output control apparatus according to the present invention as a part of a microcomputer system.

Generally, in the battery pack 100 to be mounted on an HEV or the like, plural battery modules (cells) including plural cells such as nickel-metal hydride batteries connected electrically in series are connected electrically in series, whereby a predetermined output for a motor is obtained. In the present embodiment, 2 modules form 1 block, and 20 blocks form the battery pack 100. However, the configuration of the present invention is not limited thereto.

In the battery ECU 101, reference numeral 102 denotes a voltage measuring section for measuring a terminal voltage (block voltage) of the secondary battery 100 detected by a voltage sensor (not shown) at a predetermined sampling period as voltage data V (n), and 103 denotes a temperature measuring section for measuring a temperature of the battery pack 100 detected by a temperature sensor (not shown) as temperature data T (n).

Reference numeral 104 denotes an output limiting section including information (Pp) about a short-time output value at which the secondary battery can be discharged with a high output for a short time (within seconds), and information (Pn) about a normal output value at which the secondary battery can be discharged with a normal output for a long time (within minutes) in a look-up table (LUT) 1041. The LUT 1041 previously stores information about the limit value of output electric power with a temperature being a parameter. The output limiting section 104 sets the battery voltage for limiting an output to a first discharging termination voltage (V1=9.6 V, for example) during short-time discharging, and sets the battery voltage for limiting an output to a second discharging termination voltage (V2=12.0 V, for example) during long-time discharging.

When being notified from a vehicle ECU that a high output for a short time is required, the output limiting section 104 sets the output limit value to a higher short-time output value Pp. When the voltage data V (n) from the voltage measuring section 102 is decreased to the first discharging termination voltage V1 during short-time discharging, the output limiting section 104 lowers the short-time output value Pp with reference to the LUT 1041 according to the temperature data T (n) from the temperature measuring section 103, so that the battery voltage is increased to the second discharging termination voltage V2 within seconds, and transmits the obtained output limit information Pout to the vehicle ECU.

On the other hand, when being notified from the vehicle ECU that a normal output for a long time is required, the output limiting section 104 sets the output limit value to a normal output value Pn lower than the short-time output value Pp. When the voltage data V (n) from the voltage measuring section 102 is decreased to the second discharging termination voltage V2 during long-time discharging, the output limiting section 104 lowers the normal output value Pn with reference to the LUT 1041 according to the temperature data T (n) from the temperature measuring section 103, so that the battery voltage is increased to the second discharging termination voltage V2, and transmits the obtained output limit information Pout to the vehicle ECU.

In order to cancel limits on output, the output limiting section 104 sets the short-time output value Pp and the normal output value Pn to the same value, and decreases the output limit value every time the battery voltage reaches the second discharging termination voltage V2 until the battery voltage is increased to an output limit canceling voltage (V3=15.5 V, for example).

Next, a processing procedure for output control in the battery pack system configured as described above will be described with reference to FIGS. 2 and 3.

Figure 2:
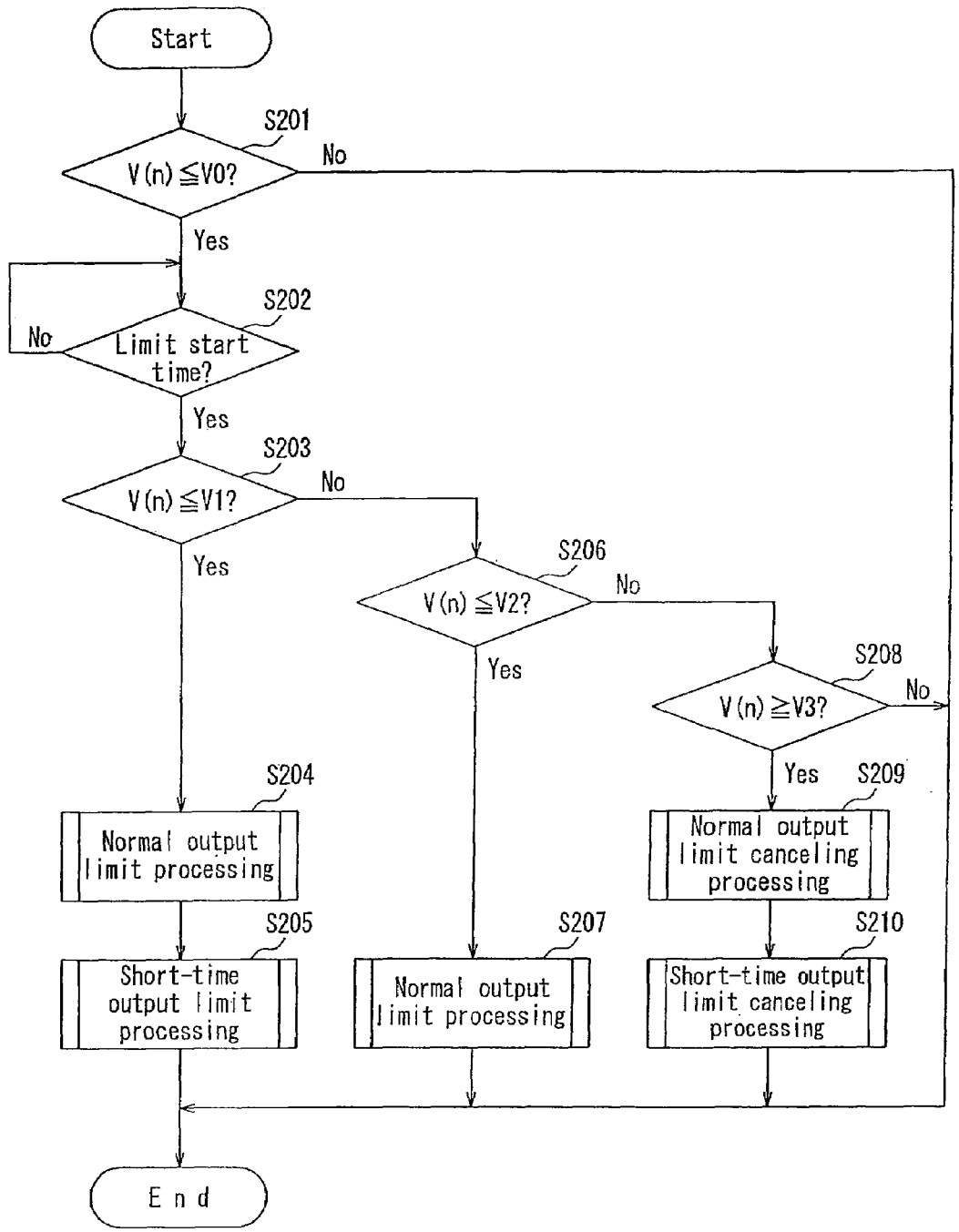
FIG. 2 is a flow chart showing a processing procedure in a method for controlling an output of a secondary battery according to the present embodiment.
Figure 3:
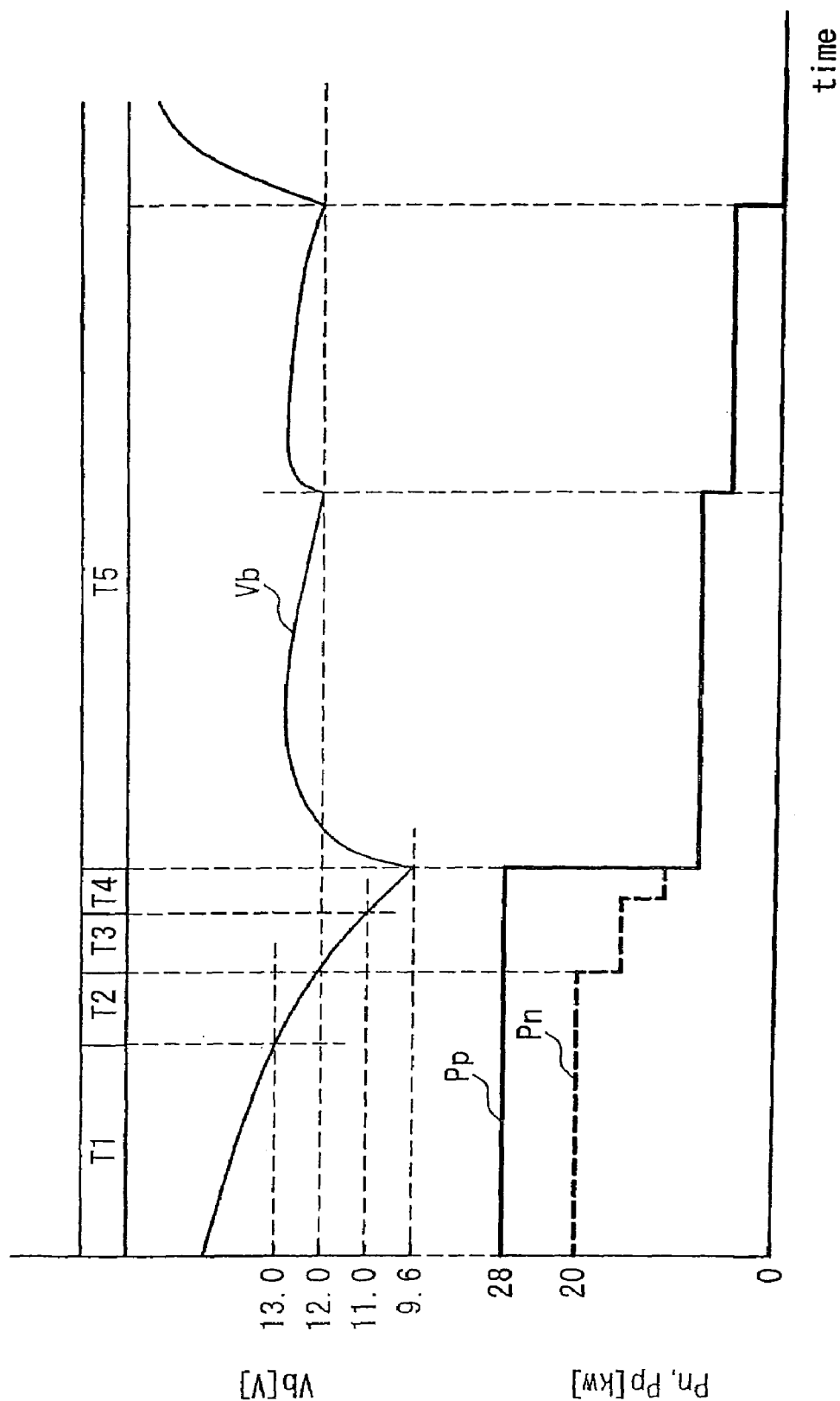
FIG. 3 is a diagram showing an example of a change with the passage of time in a battery voltage Vb (voltage data V (n)) during short-time discharging, a short-time output limit value Pp, and a normal output limit value Pn in the output control method of the present embodiment.
Figure 4:
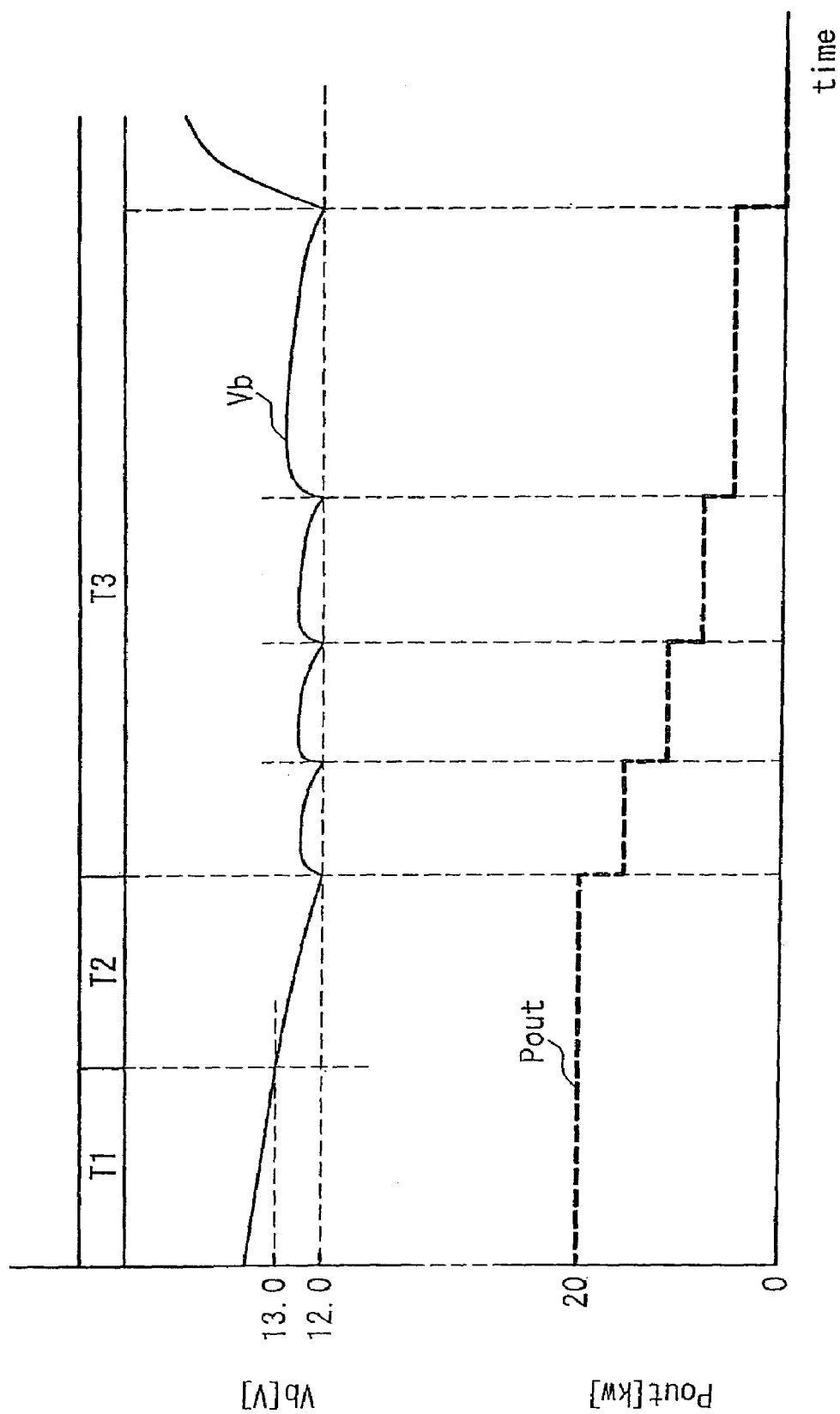
FIG. 4 is a diagram showing an example of a change with the passage of time in a battery voltage Vb and an output limit value Pout in a conventional output control method.

FIG. 2 is a flow chart showing a processing procedure in a method for controlling an output of a secondary battery according to the present embodiment. FIG. 3 is a diagram showing an example of a change with the passage of time in the battery voltage Vb (voltage data V (n)) during short-time discharging, the short-time output limit value Pp, and the normal output limit value Pn in the output control method of the present embodiment.

In FIG. 2, initially, the voltage data V (n) is measured, and it is determined whether or not the measured voltage data V (n) is decreased to an output limit preparatory voltage (V0=13.0 V, for example) in a normal mode (time interval T1 in FIG. 3) (S201). In the case where it is determined in Step S201 that the voltage data V (n) has reached the output limit preparatory voltage V0 (Yes: time interval T2 in FIG. 3), time count is performed, and it is determined whether or not count to an output limit start time (e.g., for about 10 seconds) is completed (S202). In the case where it is determined in Step S202 that count to the output limit start time has been completed (Yes), an output limit mode is started, where it is determined whether or not the voltage data V (n) is equal to or lower than the first discharging termination voltage V1 (e.g., 9.6 V), which corresponds to short-time discharging (S203).

In the case where it is determined in Step S203 that the voltage data V (n) is higher than the first discharging termination voltage V1 (No), the process branches to Step S206 where it is determined whether or not the voltage data V (n) is equal to or lower than the second discharging termination voltage V2 (e.g., 12.0 V), which corresponds to long-time discharging. In the case where it is determined in Step S206 that the voltage data V (n) is equal to or lower than the second discharging termination voltage V2 (Yes: time interval T3 in FIG. 3), normal output limit processing is performed (S207). In the normal output limit processing in Step S207, the output limit value Pn corresponding to long-time discharging is decreased with respect to time count so that the rated output is decreased by a predetermined amount (time intervals T3 and T4 in FIG. 3).

On the other hand, in the case where it is determined in Step S203 that the voltage data V (n) is equal to or lower than the first discharging termination voltage V1 (Yes), the output limit value Pp during short-time discharging and the output limit value Pn during long-time discharging are set to the same value (e.g., from respective initial values of 28 kW and 20 kW to 10 kW), and the output limit value is decreased to achieve a predetermined decrease in rated output (e.g., −2 kW/second at the maximum), so that the battery voltage returns to the second discharging termination voltage V2 within seconds in normal output limit processing (S204) and short-time output limit processing (S205) (time interval T5 in FIG. 3).

The output limit value is decreased in this way, and in the case where it is determined in Step S206 that the voltage data V (n) is higher than the second discharging termination voltage V2 (No), then, the process branches to Step S208 where it is determined whether or not the voltage data V (n) is equal to or higher than the output limit canceling voltage V3 (e.g., 15.5 V). In the case where it is determined in Step S208 that the voltage data V (n) is equal to or higher than the output limit canceling voltage V3 (Yes), the output limit value Pp during short-time discharging and the output limit value Pn during long-time discharging are set to their initial values, and limits on output are canceled in normal output limit canceling processing (S209) and short-time output limit canceling processing (S210).

As described above, according to the present invention, the output value of the secondary battery can be set appropriately upon request of the vehicle such as an HEV by using two pieces of information, i.e., the short-time output information and the normal output information. For example, by allowing the vehicle to have a high output for a short time, the secondary battery also can be used to start the engine, change the gear, and the like.

What is claimed is:

1. An apparatus for controlling an output of a secondary battery, comprising:
   a voltage measuring section for measuring a terminal voltage of a secondary battery as voltage data; and
   an output limiting section for limiting discharging of the secondary battery so as not to exceed a limit value of output electric power and for changing the limit value of output electric power when the voltage data from the voltage measuring section reaches a predetermined discharging termination voltage,
   wherein the output limiting section has short-time output information for setting operation to allow short-time discharging at higher power of the secondary battery and normal output information for setting operation to allow long-time discharging at lower power of the secondary battery,
   the discharging termination voltage comprises a first discharging termination voltage during short-time discharging under the operation with the short-time output information and a second discharging termination voltage during long-time discharging under the operation with the normal output information, and
   the first discharging termination voltage being set to be lower than the second discharging termination voltage.

2. An apparatus for controlling an output of a secondary battery, comprising:
   a voltage measuring section for measuring as voltage data, a terminal voltage of a battery pack that includes a combination of a plurality of cells as secondary batteries and is used in an intermediate state of charging; and
   an output limiting section for limiting discharging of the secondary battery so as not to exceed a limit value of output electric power and for changing the limit value of output electric power when the voltage data from the voltage measuring section reaches a predetermined discharging termination voltage,
   wherein the output limiting section has short-time output information for setting operation to allow short-time discharging at higher power of the secondary battery and normal output information for setting operation to allow long-time discharging at lower power of the secondary battery,
   the discharging termination voltage comprises a first discharging termination voltage during short-time discharging under the operation with the short-time output information and a second discharging termination voltage during long-time discharging under the operation with the normal output information, and
   the first discharging termination voltage being set to be lower than the second discharging termination voltage.

3. A battery pack system, comprising:
   the apparatus for controlling an output of a secondary battery of claim 2; and
   a battery pack.

4. The battery pack system according to claim 3, wherein the apparatus for controlling an output of a secondary battery is configured as a computer system.

5. A motor-driven vehicle on which a battery pack system including the apparatus for controlling an output of a secondary battery of claim 2 and a battery pack is mounted.

6. The motor-driven vehicle according to claim 5, wherein the apparatus for controlling an output of a secondary battery is configured as a computer system.

7. A method for controlling an output of a secondary battery, comprising:
   measuring a terminal voltage of a secondary battery as voltage data;
   changing a limit value of output electric power from the secondary battery when the voltage data reaches a predetermined discharging termination voltage; and
   discharging of the secondary battery being limited so as not to exceed the limit value,
   wherein short-time output information for setting operation to allow short-time discharging at higher power of the secondary battery and normal output information for setting operation to allow long-time discharging at lower power of the secondary battery are provided,
   the discharging termination voltage comprises a first discharging termination voltage during short-time discharging under the operation with the short-time output information and a second discharging termination voltage during long-time discharging under the operation with the normal output information, and
   the first discharging termination voltage being set to be lower than the second discharging termination voltage.

8. A method for controlling an output of a secondary battery, comprising:
   measuring as voltage data, a terminal voltage of a battery pack that includes a combination of a plurality of cells as secondary batteries and is used in an intermediate state of charging;
   changing a limit value of output electric power from the secondary battery when the voltage data reaches a predetermined discharging termination voltage; and
   discharging of the secondary battery being limited so as not to exceed the limit value, wherein short-time output information for setting operation to allow short-time discharging at higher power of the secondary battery and normal output information for setting operation to allow long-time discharging at lower power of the secondary battery are provided, the discharging termination voltage comprises a first discharging termination voltage during short-time discharging under the operation with the short-time output information and a second discharging termination voltage during long-time discharging under the operation with the normal output information, and the first discharging termination voltage being set to be lower than the second discharging termination voltage.

9. A battery pack system, comprising:

the computer system for performing the method for controlling an output of a secondary battery of claim 8; and a battery pack.

10. A motor-driven vehicle on which a battery pack system including the computer system for performing the method for controlling an output of a secondary battery of claim 8 and a battery pack is mounted.

* * * * *